(12) United States Patent
Schechter et al.

(10) Patent No.: US 6,487,565 B1
(45) Date of Patent: Nov. 26, 2002

(54) UPDATING ANIMATED IMAGES REPRESENTED BY SCENE GRAPHS

(75) Inventors: Greg D. Schechter, Seattle; Chun-Fu R. Yeung, Issaquah; Danny R. Dalal, Redmond, all of WA (US)

(73) Assignee: Microsoft Corporation, Redmond, WA (US)

(*) Notice: Subject to any disclaimer, the term of this patent is extended or adjusted under 35 U.S.C. 154(b) by 0 days.

(21) Appl. No.: 09/223,075

(22) Filed: Dec. 29, 1998

(51) Int. Cl.[7] .................................................. G09G 5/12
(52) U.S. Cl. ..................................... 707/500.1; 345/418
(58) Field of Search .......................... 707/500.1, 501.1, 707/513, 514, 515, 516; 345/418

(56) References Cited

U.S. PATENT DOCUMENTS

| | | | | |
|---|---|---|---|---|
| 4,599,611 A | * | 7/1986 | Bowker et al. | 345/116 |
| 4,857,902 A | * | 8/1989 | Naimark et al. | 345/167 |
| 5,189,402 A | * | 2/1993 | Naimark et al. | 345/122 |
| 5,574,503 A | * | 11/1996 | May | 348/409 |
| 5,708,767 A | * | 1/1998 | Yeo et al. | 345/440 |
| 5,764,241 A | | 6/1998 | Elliott et al. | 345/473 |
| 5,883,639 A | * | 3/1999 | Walton et al. | 345/473 |
| 6,072,496 A | * | 6/2000 | Guenter et al. | 345/419 |
| 6,100,881 A | * | 8/2000 | Gibbons et al. | 345/302 |
| 6,154,215 A | * | 11/2000 | Hopcroft et al. | 345/418 |
| 6,243,706 B1 | * | 6/2001 | Moreau et al. | 707/1 |

OTHER PUBLICATIONS

Foley, J.D., et al., "The Image Display System", In: *Fundamentals of Interactive Computer Graphics*, Adison–Wesley Publishing Company, pp. 489–492, (1982).

* cited by examiner

*Primary Examiner*—Joseph H. Feild
*Assistant Examiner*—Maikhanh Nguyen
(74) *Attorney, Agent, or Firm*—Christensen O'Connor Johnson Kindness PLLC (57) ABSTRACT

Each frame in an animated graphics sequence has a hierarchical scene graph. Graph elements have creation timestamps that mark them as dirty, requiring rendering, or constant, not requiring rendering anew for the current frame. If an aggregate element is constant, it is rendered as a whole, without investigating its child elements. If dirty elements meet certain criteria, they are merged for rendering as a single unit. In this way, the scene areas to be rendered have variable positions and sizes.

26 Claims, 5 Drawing Sheets

UPDATING ANIMATED IMAGES REPRESENTED BY SCENE GRAPHS

TECHNICAL FIELD

The present invention relates to electronic data processing, and more particularly concerns efficient frame updating of animated graphics.

BACKGROUND

From the earliest days of graphics animation, designers and artists have realized that a great deal of effort is wasted by redrawing an entire scene or image for the next frame when only a part of the current frame changes between the two frames. Long before the advent of computer graphics, "tweeners" in the motion-picture industry employed different layers for portions of a scene that stayed constant from one cel to the next, and redrew the changing portions on a separate overlay layer.

Computer programs have always attempted to avoid unnecessary manipulations of data. For example, all word processors avoid recopying an active text file that has not been changed since it was loaded. These and other programs frequently set a "dirty bit" associated with a file whenever the file is modified such that a previous copy is no longer current.

Graphics animation programs have adopted the dirty-bit concept. Some conventional rendering programs divide a two-dimensional image into subareas such as small rectangles, then track modifications to each rectangle separately. Only the combination of the parts that changed in the previous frame and those that will change in the current frame are updated. However, these subareas have fixed sizes and/or locations, and Although higher computer speed and larger memory size enables brute-force and other conventional update techniques to achieve higher speed, there always remains a need to use all available approaches to furthering this goal, especially for presentations that are animated in real time.

SUMMARY OF THE INVENTION

One approach to increasing frame-update speed in graphic animation is to refine the determination of which parts of an image have not changed, and therefore need not be updated. The present invention produces successive frames of an image represented as a hierarchical scene graph in a declarative modeling language. It encodes creation-time information in the elements of the graph to eliminate unnecessary rendering of graph elements that have not changed since the preceding frame. The hierarchical structure can also optionally be employed to process multiple elements as single units rather than considering each of them separately. For example, a search for unchanged elements can stop at an unchanged aggregate element, and need not search any of its child elements in the scene graph. As another example, multiple changed nodes can be tested to determined whether they can be rendered more efficiently as a single element, then merged if so.

DETAILED DESCRIPTION

The following description, taken in conjunction with the drawing, enables one skilled in the art to make and use the invention. The description is illustrative only; modifications and further advantages will suggest themselves as the description proceeds. The scope of the invention is to be measured only from the appended claims. In particular, the word "scene" must be taken in a broad sense. Although the description is cast in terms of visual scenes, the invention is also useful with other media formats, such as audio.

Exemplary Operating Environment

Figure 1:
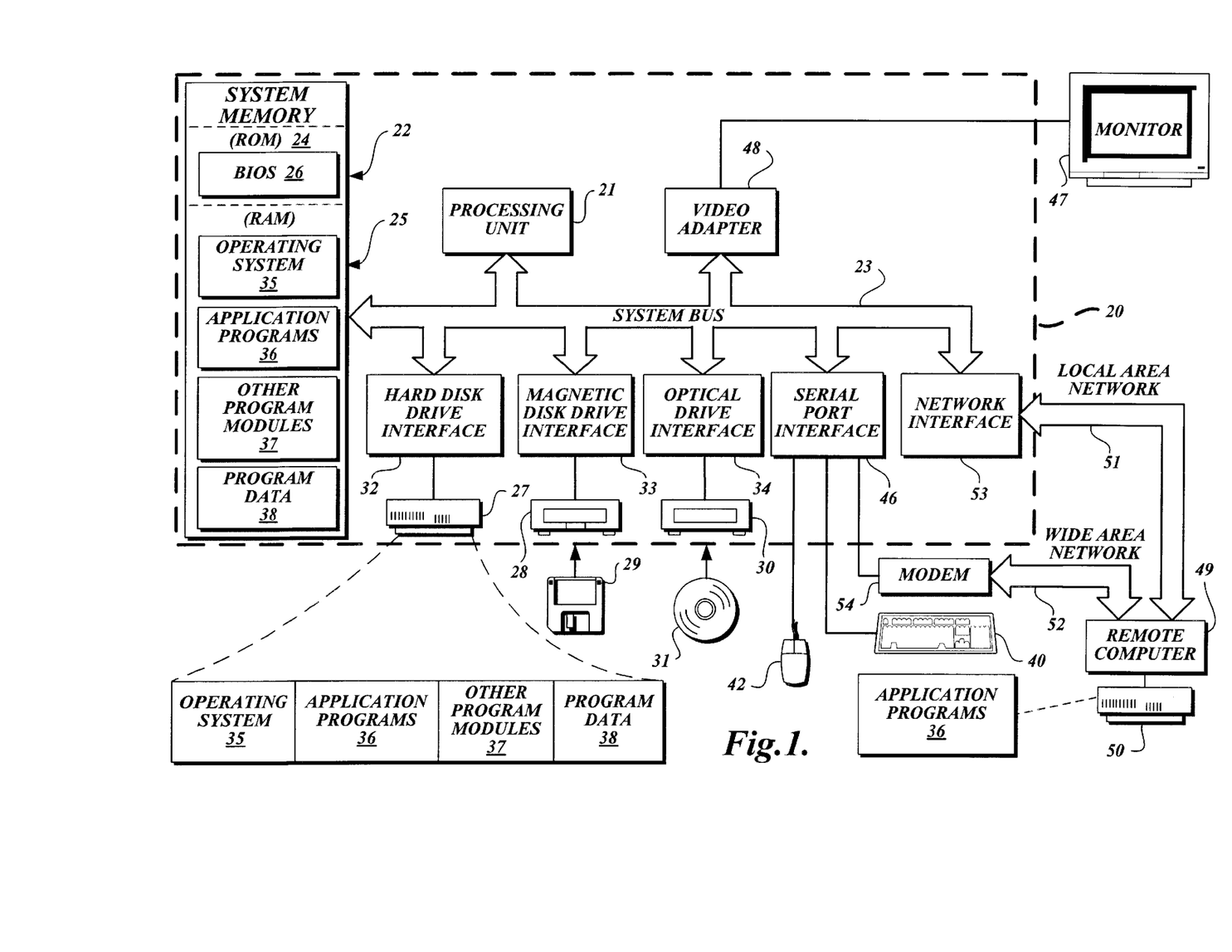
FIG. 1 is a block diagram of a typical environment for the present invention.

FIG. 1 provides a brief, general description of a suitable computing environment in which the invention may be implemented. The invention will hereinafter be described in the general context of computer-executable instructions such as program modules, executed by a personal computer (PC); however, other environments are possible. Program modules include routines, programs, objects, components, data structures, etc. that perform particular tasks or implement particular abstract data types. Those skilled in the art will appreciate that the invention may be practiced with other computer-system configurations, including hand-held devices, multiprocessor systems, microprocessor-based programmable consumer electronics, network PCs, minicomputers, mainframe computers, and the like. The invention may also be practiced in distributed computing environments where tasks are performed by remote processing devices linked through a communications network. In a distributed computing environment, program modules may be located in both local and remote memory storage devices.

FIG. 1 shows an exemplary system for implementing the invention. It employs a general-purpose computing device in the form of a conventional personal computer 20, which includes processing unit 21, system memory 22, and system bus 23 that couples the system memory and other system components to processing unit 21. System bus 23 may be any of several types, including a memory bus or memory controller, a peripheral bus, and a local bus, and may use any of a variety of bus structures. System memory 22 includes read-only memory (ROM) 24 and random-access memory (RAM) 25. A basic input/output system (BIOS) 26, stored in ROM 24, contains the basic routines that transfer information between components of personal computer 20. BIOS 24 also contains start-up routines for the system. Personal computer 20 further includes hard disk drive 27 for reading from and writing to a hard disk (not shown), magnetic disk drive 28 for reading from and writing to a removable magnetic disk 29, and optical disk drive 30 for reading from and writing to a removable optical disk 31 such as a CD-ROM or other optical medium. Hard disk drive 27, magnetic disk drive 28, and optical disk drive 30 are connected to system bus 23 by a hard-disk drive interface 32, a magnetic-disk drive interface 33, and an optical-drive interface 34, respectively. The drives and their associated computer-readable media provide nonvolatile storage of computer-readable instructions, data structures, program modules and other data for personal computer 20. Although the exemplary environment described herein employs a hard disk, a removable magnetic disk 29 and a removable optical disk 31, those skilled in the art will appreciate that other types of computer-readable media which can store data accessible by a computer may also be used in the exemplary operating environment. Such media may include magnetic cassettes, flash-memory cards, digital versatile disks, Bernoulli cartridges, RAMs, ROMs, and the like.

Program modules may be stored on the hard disk, magnetic disk 29, optical disk 31, ROM 24 and RAM 25. Program modules may include operating system 35, one or more application programs 36, other program modules 37, and program data 38. A user may enter commands and information into personal computer 20 through input devices such as a keyboard 40 and a pointing device 42. Other input devices (not shown) may include a microphone, joystick, game pad, satellite dish, scanner, or the like. These and other input devices are often connected to the processing unit 21 through a serial-port interface 46 coupled to system bus 23; but they may be connected through other interfaces not shown in FIG. 1, such as a parallel port, a game port, or a universal serial bus (USB). A monitor 47 or other display device also connects to system bus 23 via an interface such as a video adapter 48. In addition to the monitor, personal computers typically include other peripheral output devices (not shown) such as speakers and printers.

Personal computer 20 may operate in a networked environment using logical connections to one or more remote computers such as remote computer 49. Remote computer 49 may be another personal computer, a server, a router, a network PC, a peer device, or other common network node. It typically includes many or all of the components described above in connection with personal computer 20; however, only a storage device 50 is illustrated in FIG. 1. The logical connections depicted in FIG. 1 include local-area network (LAN) 51 and a wide-area network (WAN) 52. Such networking environments are commonplace in offices, enterprise-wide computer networks, intranets and the Internet.

When placed in a LAN networking environment, PC 20 connects to local network 51 through a network interface or adapter 53. When used in a WAN networking environment such as the Internet, PC 20 typically includes modem 54 or other means for establishing communications over network 52. Modem 54 may be internal or external to PC 20, and connects to system bus 23 via serial-port interface 46. In a networked environment, program modules depicted as residing within 20 or portions thereof may be stored in remote storage device 50. Of course, the network connections shown are illustrative, and other means of establishing a communications link between the computers may be substituted.

Declarative Modeling

The embodiment described below is set in the context of scenes constructed in a declarative modeling language having reactive capability. Whereas an imperative modeling language specifies a scene as a sequence of operations for realizing the scene, a declarative language lists the components of a scene as a connected graph of primitive constructs. A separate interpreter traverses the graph and renders the components for each frame of the scene. A reactive declarative language adds language constructs that describe certain behaviors that one or more components can perform, such as rotation or fading. A scene can include behaviors as well as static components. The interpreter executes the behaviors upon the static components according to their placement in the graph. Behaviors can depend upon time, and/or upon external events, such as a mousebutton press from a user. U.S. Pat. No. 5,764,241 to Elliott, et al, hereby incorporated by reference, describes a declarative modeling language capable of representing reactive behaviors and an interpreter for processing visual scenes or other data.

Figure 2:
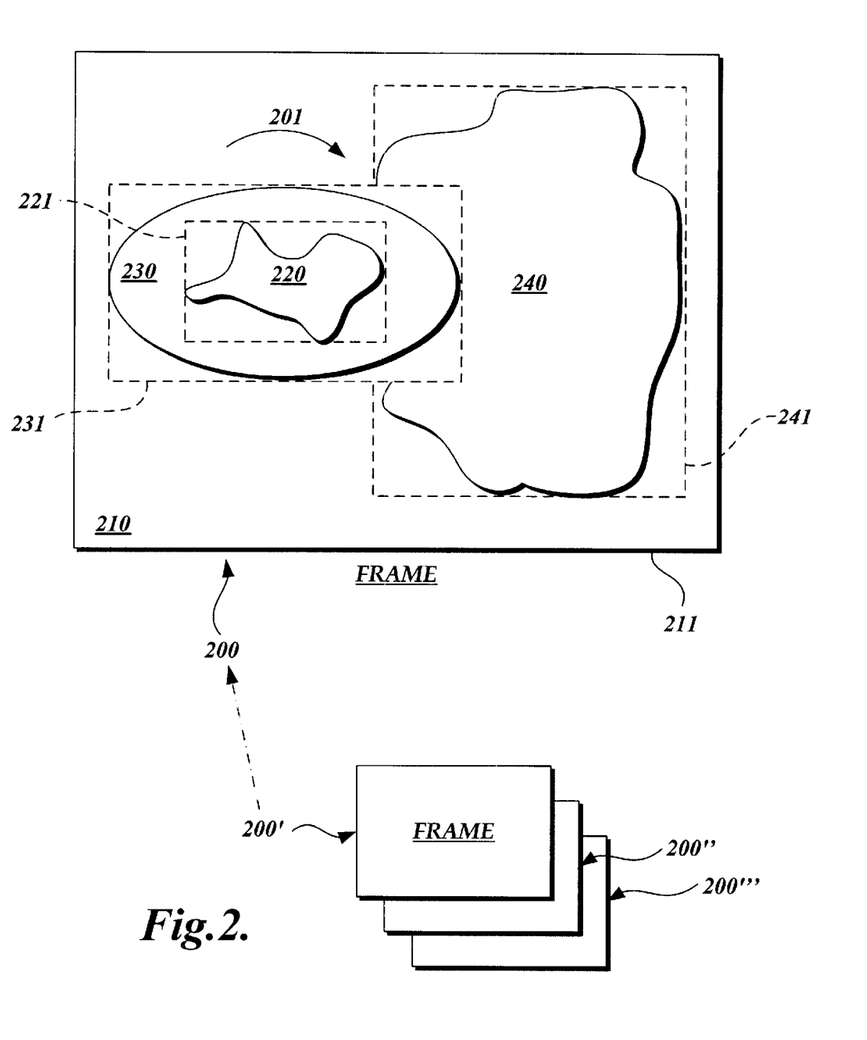
FIG. 2 shows an illustrative scene processed by the present invention.

FIG. 2 shows one frame 200 of a sequence of frames 200', 200", 200''', etc., of an animation. The total image depicted in a frame is the scene 210. Scene 210 comprises multiple primitive elements having structured relationships to each other. In this example, a bitmap image 220 overlies a generated oval shape 230. This combination rotates clockwise as a unit, indicated by arrow 201, and overlies another image 240. A program such as publicly available Microsoft® Direct Animation® defines objects that are elements in the scene graph. Many of the conventional terms and concepts described below can be found in standard graphics texts such as J. D. Foley and A. Van Dam, FUNDAMENTALS OF INTERACTIVE COMPUTER GRAPHICS (Addison-Wesley, 1982 and later editions).

Each of the primitive images 220, 230, and 240 has its own boundary box or "bbox" 221, 231, and 241 listing its minimum and maximum coordinate values in both the horizontal and vertical directions. Boundary 211 of the entire image is expressed in world coordinates. The bboxes of the elements are expressed in local coordinates of the elements themselves. The relationship between world and local coordinates is specified via a conventional composite modeling transform resulting from the combination of all the accumulated individual modeling transformations. Translations between the two sets of coordinates are performed automatically at various times.

Figure 3:
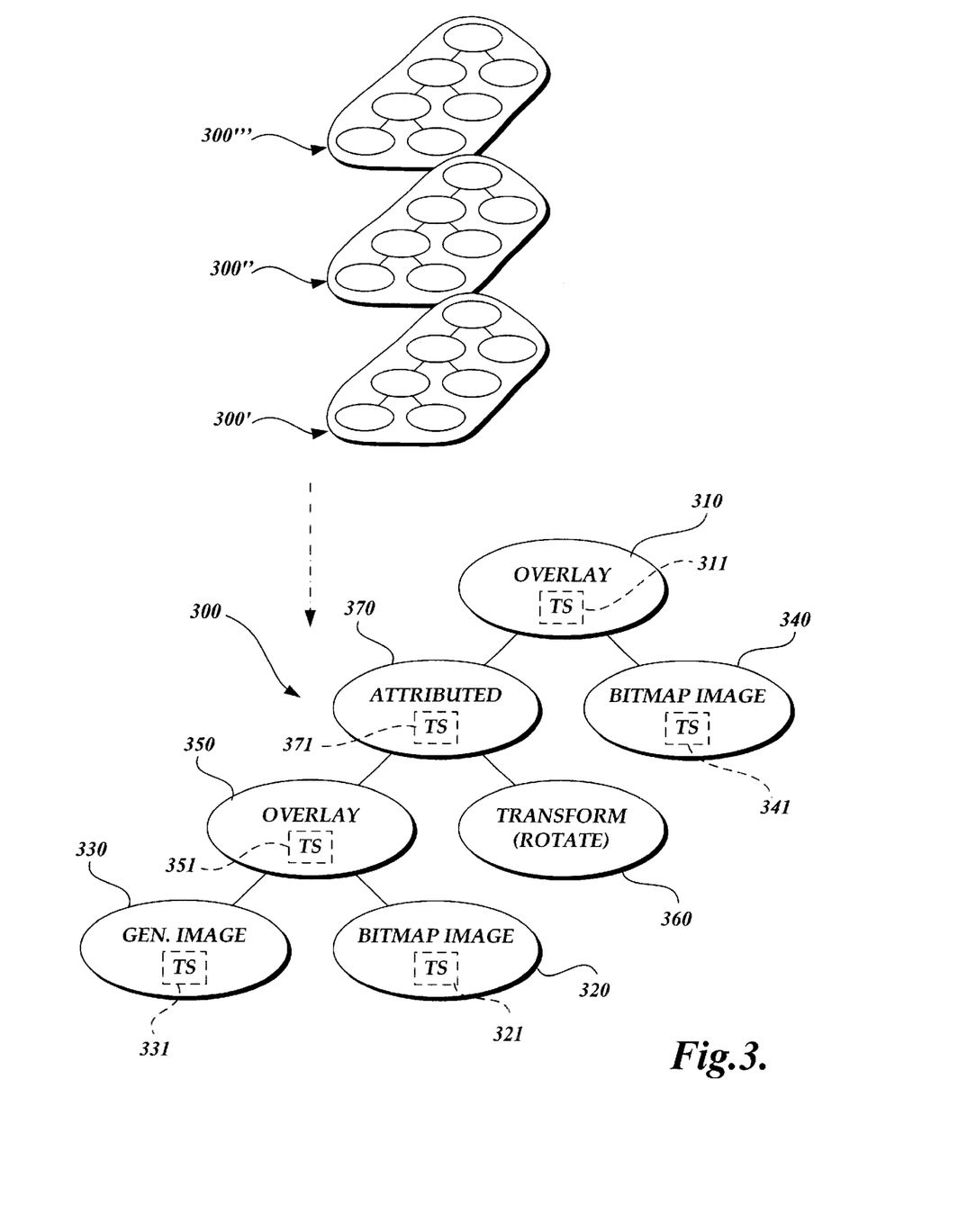
FIG. 3 shows a graph of the scene of FIG. 2.

FIG. 3 is a scene graph 300 of the example scene 200 in FIG. 2, modeled in a reactive declarative language. Because the number and relationships of the scene elements can change from one frame to the next, each of the frames 200', 200", and 200''' in FIG. 2 has its own corresponding scene graph 300', 300", and 300'''. Node 310 is the root node for the entire scene 210. Each image element has a corresponding primitive node in the graph. Nodes 320, 330, and 340 represent the three simple images 220, 230, and 240, respectively. Node 350 is an aggregate node for grouping multiple image elements in its subgraph into a single entity that can be operated upon as a unit. An aggregate node is also called an overlay. The root node of every (multi-element) scene is an aggregate node. Node 360 represents the rotation operation that is applied to the aggregated bitmap 220 and oval 230 (i.e., to overlay node 350). Node 370 is an attributed node, representing the application of operation 360 to aggregate node 350. The final overlay 310, representing the entire scene, is an aggregate of primitive image node 340 and attributed node 370. A scene graph in a real-world animation typically has dozens to hundreds of nodes arranged in complex subgraphs. Also, more than one node can point to the same node farther down the graph, as long as the entire structure remains acyclic.

As described more fully in the patent to Elliott et al., an engine produces an animated presentation from a declarative representation of a scene having reactive behaviors, called a behavior graph. The engine constructs successive frames of the scene by applying the behaviors to the appropriate components to construct a new static scene graph for each frame, and by calling a rendering module to render the components of the frame according to the graph. Blocks 214 and 226 in FIG. 8A of the Elliott et al. patent show modules for constructing and rendering a frame. Elliot et al. render anew each element of the scene graph of each frame. The present invention accelerates the overall animation process by allowing some previously rendered graph elements to be reused in succeeding frames.

Improved Animation

The invention adds timestamps, or sequence numbers, to the scene graph 300 for each frame. The timestamp associated with an element in the scene graph of each frame represents the time or order of its creation. The units are arbitrary, as long as the rendering module can determine whether the element was created for the current frame or for some previous frame. In addition, two special timestamp values can specify that the element never changes and that it changes for every frame. Because the embodiment described herein builds a completely new scene graph for each frame, any change to an element from a preceding frame creates a new element with a new timestamp; this guarantees that its timestamp is updated whenever a change occurs in that element.

For the great majority of scenes, the timestamp 311 for root node 310 of a frame's scene graph changes for every frame, because at least some of the underlying graph elements 320–370 will have changed from one frame to the next. Timestamp 341 may signify that the constant bitmap image 340 (shown as 240 in FIG. 2) never changes. Timestamp 371 of node 370 changes when the rotation operation of element 360 modifies the composite image represented by element 350 from a previous frame. Timestamp 351, on the other hand, might never change. Element 350 consists of a bitmap 320, whose timestamp 321 indicates an unchanging image, and a generated image 330. If the generated image does not change from one frame to the next, then its timestamp 331 remains constant between those two frames. It is important to note at this point that a constant timestamp 351 for a composite overlay image implies that its component elements 320 and 330 have also remained unchanged between those two frames. Therefore, a search to find changed (i.e., dirty) elements need not read the timestamps of elements 320 and 330 if it finds that timestamp 351 of their parent element 350 has not changed.

Figure 4:
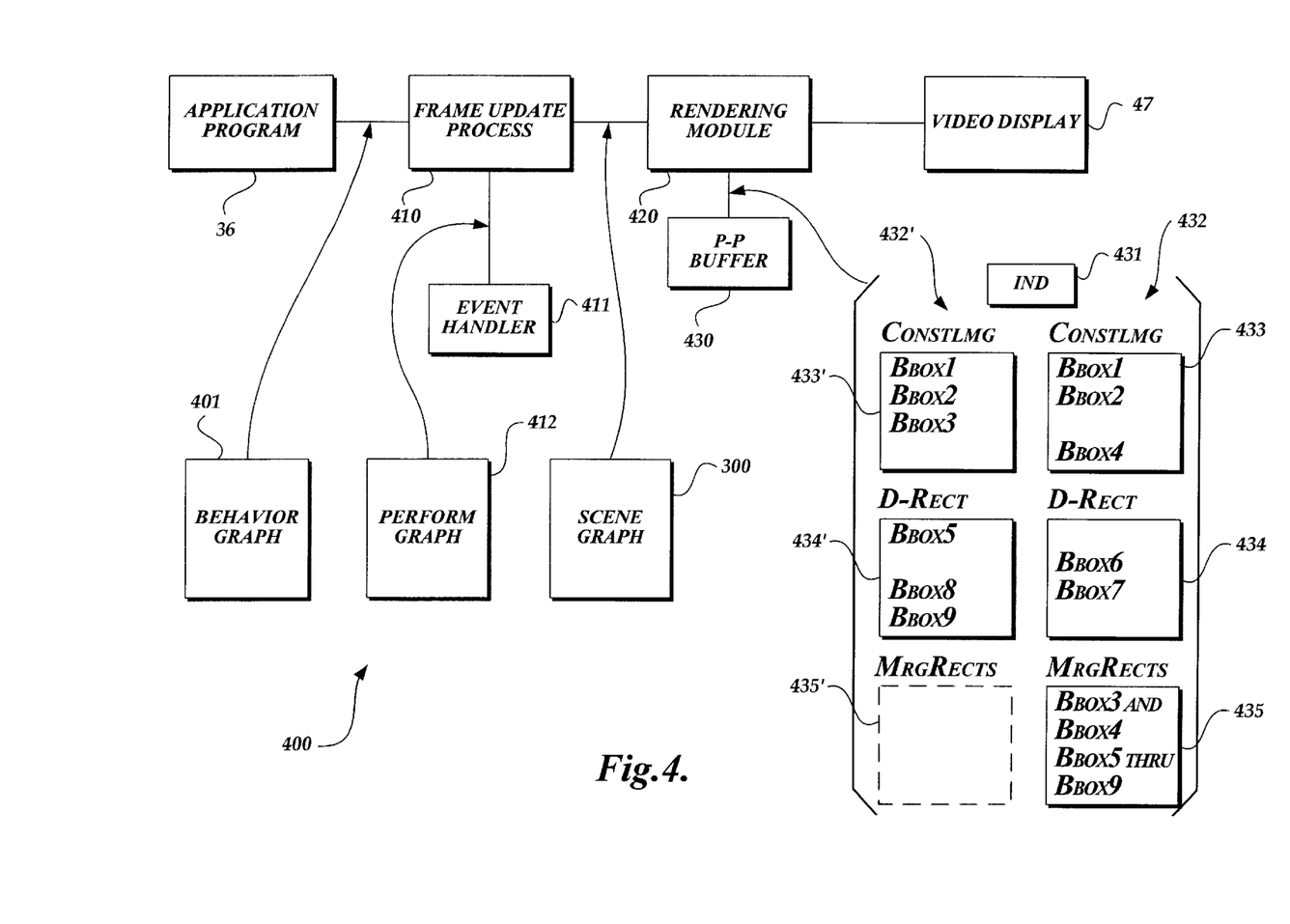
FIG. 4 is a block diagram of a system for animating a sequence of frames according to the invention.

FIG. 4 is a block diagram of a system 400 for animating a sequence of frames 200 represented by graphs 300 in an engine for a reactive declarative modeling language.

An application program 36, such as a conventional viewer, selects a scene to be presented, and sends the behavior graph of that scene to frame constructor 410. Event handler 411 asynchronously tracks and records the occurrence of any external events that might affect the behavior graph, such as a mouse click or a key press. Constructor 410 builds a performance graph 412 from this data. A performance graph is a simplified form of the behavior graph that includes the present status of the events. For example, if a key that adds a certain image has not yet been pressed, then the element representing that image is not included in the newly constructed performance graph. Because events can occur at any time, building new performance graphs is asynchronous with respect to frames. Constructor 410 traverses the current performance graph to build a new scene graph 300 for each frame by executing time-dependent operations, such as time-based rotation and fading, the appropriate performance-graph elements. In summary, the behavior graph is an unchanging representation of a scene across all time and events. A performance graph represents the scene elements with respect to the current status of all relevant events encoded in the behavior graph. A scene graph (sometimes also called a static-value graph or a frame graph) represents the application of all time-dependent operations to the performance-graph elements with respect to a particular point in time.

Rendering module 420 receives a sequence of frame graphs from constructor 410 and converts them to rasterized or other forms suitable for presentation on display 47.

Ping-pong buffer 430 stores a data structure representing the previous and current frames. Frame data in buffer 430 includes an indicator bit 431 to designate which side of the buffer contains the previous frame and which the current frame. In this exposition, the current frame is the frame just completed in constructor 410; it is shown stored into the right side of the data structure in FIG. 4. Unprimed numerals designate current-frame data 432 in the structure. The previous frame is the one just prior to the current frame, that has just been rendered and displayed to the user. Its data 432', designated with corresponding primed numerals, is shown stored in the left side of the data structure.

Each frame's data includes a list 433 of constant images. The labels "Bbox1," etc., denotes the identification of a scene-graph element in terms of the coordinates of its boundary box. The illustrative numerals are arbitrary, because the scene graph can change its topology from one frame to the next. A constant image has not changed since the preceding frame. That is, constant images such as Bbox1, Bbox2, and Bbox4 can be displayed without rendering them anew for the current frame. A constant image can, however, appear or disappear as a unit between frames of an animation, as shown at Bbox3 in list 433' and Bbox4 in list 433. Some implementations may require the preservation of certain sequences in order to avoid altering the topology unintentionally. For example, if the scene graph changes from one frame to the next and both frames have multiple constant images, they must be encountered in the same order in consecutive frames, so that they will not be added to the list of dirty rectangles to be updated. If multiple constant images appear in a different order from one frame to the next, then the topology of the scene will have changed, and the overall picture might be different. If a current frame has "Bbox1 over Bbox2" and a next frame has "Bbox2 over Bbox1," adding both of them to the array of dirty rectangles would be necessary to make visible the swap in front-to-back ordering. Therefore, if no topology change is intended, Bbox1 and Bbox2 must occur in the constant-image list in the same order for every frame.

Dirty-rectangle list 434 identifies the elements that rendering module 440 must recreate in order to display their frame. In this example, Bbox6 and Bbox7 must be rendered again for the current frame. Dirty elements can be merged, as described below.

Figure 5:
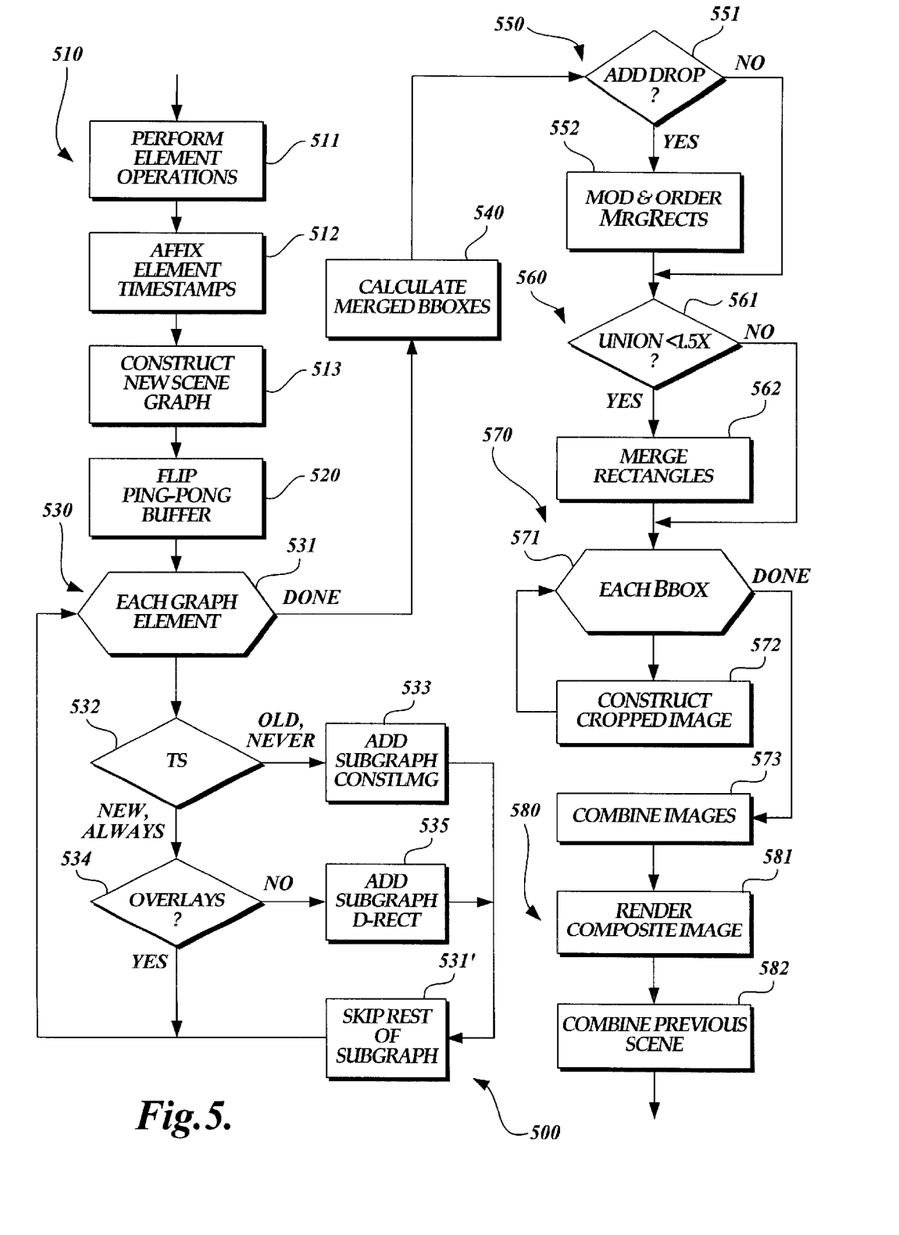
FIG. 5 is a flow chart of a method for updating a frame according to the invention.

FIG. 5 is a flowchart 500 depicting the operation of a module 410 that renders frames according to the invention. The blocks are grouped for clarity of exposition; their order does not imply any particular time sequence.

Blocks 510 construct a new current frame. Block 511 applies the operations specified in the performance graph in a conventional manner so as to modify some of the elements of the scene. Block 512 affixes timestamps to the image elements as described above. Briefly, if an element has remained constant since the preceding frame, its timestamp remains unchanged. If it has been modified, it receives a timestamp reflecting the time or sequence number of the current frame. An additional value signifies an element that never changes. Another value signifies that an element is to be treated as though it changes for every frame. Block 513 constructs the new scene graph 300, FIG. 3, for the current frame in a conventional way.

Block 520 flip the ping-pong buffer 430 to accept the new current frame. If the previous frame data is stored in column 432', then indicator 431 changes to show that the new current-frame data will be stored in column 432. The data previously contained in column 432 is cleared out. The use of a ping-pong buffer allows data from the current frame to be compared with that from the previous frame; other convenient mechanisms can be substituted for this purpose.

Blocks 530 place data into the ConstImg list 433 and the D-Rect list 434 for the current frame. Block 531 traverses the nodes of the scene graph.

If block 532 determines that the timestamp of an element is that of a previous frame, or that the element never changes, then block 533 adds the Bbox for that element and for all the elements in its subgraph to ConstImg list 433. Block 533 actually places only one Bbox into list 433, and that Bbox includes the areas of all image elements in the subgraph of the current node. Block 531' then tells block 531 to skip the remaining nodes in the subgraph of that element and to begin traversing the next subgraph. When the root node of any subgraph is marked as old, then every image in that subgraph is necessarily also old. Therefore, a Bbox for the entire subgraph can be immediately added to ConstImg, without taking the time to traverse any of its nodes individually.

If the timestamp is associated with the current frame, or if it forces the element to appear always to have changed, then block 534 determines whether or not the element contains any overlays. If not, then block 535 places it in D-Rect list 434 as a dirty rectangle. The Bbox that is placed in list 434 includes the areas of the elements of any nodes in its subgraph. In this case also, block 531' inhibits traversal of any nodes in the subgraph of the current node, causing block 531 to begin traversing the next subgraph immediately. Here again, the knowledge that a node is dirty and contains no overlays means that all of its subelements can be consigned to the dirty list without taking the time to investigate them individually.

Therefore, blocks 530 can avoid traversing the nodes of a subgraph when a current composite node either contains no overlays, or when it is marked as old, whether or not it contains overlays. Being able to truncate processing at the current node of a graph in all cases except where it is both new and an overlay saves a large amount of time in the graph of a complex image. In placing Bboxes into the lists and in performing calculations, blocks 530 convert the local coordinates of the Bboxes into world coordinates for the scene.

Block 540 merges list 434' with list 434 in FIG. 4, and places all the rectangles that have changed into MrgRects list 435 for the current frame. All of these rectangles have changed, and all of them must be rendered again.

Blocks 550 add and drop graph elements. In addition to elements being modified, the scene graph can also change because a constant image element first appears or disappears in the current frame. This might happen when the occurrence of an external event adds a new image from the behavior graph to the scene's performance graph. In the example of FIG. 4, although Bbox4 might have a creation time stamp associated with a previous frame, it was not an element of the previous frame at all, and thus must be rendered anew for the current frame even though its timestamp indicates otherwise. Similarly, the area in the previous frame which Bbox3 vacates must be rerendered for the current frame. Furthermore, as explained above, the order of encountering constant images constant images must be maintained if the forward/backward topology of the scene has not changed. Block 551 searches lists 433' and 433 to determine whether any of their entries need to be added to merged-rectangle list 435. Block 553 then modifies list 435 accordingly. In the example in FIG. 4, block 553 adds BBox3 and Bbox4 to the already present Bbox 5 through Bbox9.

In this embodiment, blocks 560 offer a further improvement by consolidating rectangles. Block 561 examines all the entries in merged-rectangles list 435 to determine whether rendering could be simplified by consolidating the Bbox entries. If the world coordinates of the Bboxes overlap to a considerable extent, block 562 consolidates them into a single new Bbox having coordinates embracing all the element rectangles. Specifically, if the union Bbox of all the rectangles has an area within a factor of 1.5 of the total areas of all the original rectangles, then the entire merged list 435 is replaced with the union Bbox. Other simplifying operations might also be employed if desired.

At this point, list 435 contains a number of Bbox coordinates denoting rectangles of various sizes and locations that must be rendered anew for the current frame 300. Blocks 570 lay these rectangles out in the scene to build a kind of stencil that overlies the scene from the previous frame. The "holes" in the stencil are the rectangles of list 435, containing the parts of the previous frame that have changed. Block 571 visits each Bbox in MrgRects list 435. Block 572 constructs a single cropped image of one of the original images, cropped to the dimensions of the Bbox. Block 573 combines all these cropped images into a composite image.

Blocks 580 for rendering the entire frame in module 420, FIG. 4, involves rendering the composite image for the new frame, block 581, and combining the rendered composite image with the unchanged areas of the previous frame, in block 582. This simplified rendering can be analogized to overlaying the stencil of new rectangles on the scene from the previous frame and painting through the holes (new rectangles) to replace areas of the former scene that have changed. Block 581 can be performed by any of a number of conventional rendering operations.

Another way to conceptualize method 500 is to consider all of it to be interjected into a conventional rendering pipeline. Without method 500, frame update module 410 would ask module 420 to render the entire image data structure, all of scene graph 300. Method 500 reduces the initial image of graph 300 to a new image comprising croppings of the original image. Update module 410 then asks module 420 to render only these croppings.

Process 500 then repeats for another frame, building another composite image from a scene graph for the next frame. The calculated ConstantImageList 433 and DirtyRectList 434 from frame 300 now reside in lists 433' and 434'.

Although FIG. 5 shows the construction of a scene graph immediately followed by the rendering of that same scene, there is no necessary time order. For example, blocks 510 could construct multiple frames before any of them are rendered, or some other process could intervene between the construction and rendering of a frame.

CONCLUSION

Many variations and alternatives within the scope of the following claims will appear to those skilled in the art. Software or hardware components having different names and overall functions may also serve the present invention. It must also be remembered that the methods defined below can be performed in any temporal order, except where specifically indicated in the claims.

We claim as our invention:

1. A method for generating an updated frame from a previous frame of a sequence of frames of a graphical scene having multiple elements, the updated frame including elements from the previous frame that have been modified, each element from the previous frame having an old timestamp, the method comprising:

affixing a new timestamp to each element that has been modified;

constructing a hierarchical graph of the elements in the updated frame, the hierarchical graph having a number of subgraphs;

while traversing the hierarchical graph, detecting that one of the elements has not been modified by comparing the old timestamp of the element to the new timestamp;

skipping the traversal of a subgraph of the one element, and         identifying at least some of the remaining elements as dirty elements by comparing the old timestamp of one of those remaining elements to the new timestamp;

rendering only the dirty elements of the hierarchical graph; and     combining the rendered elements with those elements that have not been modified to produce an image of the updated frame.

2. The method of claim 1 wherein the timestamp is selected from a group consisting of a timestamp that specifies the creation time of the element, a timestamp that specifies that the element never changes, and a timestamp that specifies that the element changes for every frame.

3. The method of claim 2 where the timestamps represent the relative creation times of their respective elements.

4. The method of claim 2 where modifying the some elements includes updating their timestamps.

5. The method of claim 1 where at least one of the elements is an overlay element.

6. The method of claim 5 further comprising, while traversing the graph, detecting that another of the elements has been modified and is not an overlay element,     identifying the other element as a dirty element, and     skipping traversal of the subgraph of the other element.

7. The method of claim 5 further comprising, while traversing the graph, detecting that another of the elements has been modified and is an overlay element,     traversing the subgraph of the other element.

8. The method of claim 1 where certain elements represent images of the scene and have boundary boxes indicating their respective positions in the scene.

9. The method of claim 8 further comprising constructing images of the dirty elements that represent images in the scene.

10. The method of claim 9 where the constructed images are cropped images.

11. The method of claim 9 further comprising combining the constructed images into a composite image.

12. The method of claim 11 where rendering the dirty elements of the graph comprises rendering the composite image.

13. The method of claim 12 where combining the rendered elements with the unmodified elements comprises overlaying the rendered composite on the previous scene.

14. The method of claim 8 further comprising merging at least some of the dirty elements into a single merged element.

15. The method of claim 14 where merging the some dirty elements comprises:

calculating a value of a parameter of the boundary boxes of individual ones of the some elements; and     merging the some elements if the calculated value bears a predetermined relationship to the value of the parameter of a boundary box containing the some elements.

16. The method of claim 15 where the parameter is an area.

17. The method of claim 1 further comprising adding an element to the updated frame that was not present in the previous frame.

18. The method of claim 17 further comprising including the added element as a dirty element.

19. A medium containing computer-readable instructions for executing a method for generating an updated frame from a previous frame of a sequence of frames of a graphical scene having multiple elements, the updated frame including elements from the previous frame that have been modified, each element from the previous frame having an old timestamp, the method comprising:

affixing a new timestamp to each element that has been modified;

constructing a hierarchical graph of the elements in the updated frame, the hierarchical graph having a number of subgraphs;

while traversing the hierarchical graph, detecting that one of the elements has not been modified by comparing the old timestamp of the element to the new timestamp;

skipping the traversal of a subgraph of the one element, and         identifying at least some of the remaining elements as dirty elements by comparing the old timestamp of one of those remaining elements to the new timestamp;

rendering only the dirty elements of the hierarchical graph; and     combining the rendered elements with those elements that have not been modified to produce an image of the updated frame.

20. The medium of claim 19 where the method further comprises, while traversing the graph,     detecting that another of the elements has been modified and is not an overlay element,     identifying the other element as a dirty element, and     skipping traversal of the subgraph of the other element.

21. The medium of claim 20 where the method further comprises:

constructing images of the dirty elements that represent images in the scene; and     combining the constructed images into a composite image, and     where rendering to dirty elements of the graph comprises rendering the composite image.

22. A method for rendering a current frame of an animation having a sequence of frames, each frame having a number of images that are represented by a number of elements, each element including a timestamp, the method comprising:

replacing an old timestamp of an element with a new timestamp if the element will be modified by an operation;

constructing a current scene graph for the current frame by executing one or more operations on one or more elements; and     rendering the current scene graph to form a presentation suitable for a display, the act of rendering refraining from rendering an element that lacks a new timestamp.

23. The method of claim 22, wherein each timestamp is a number in sequence.

24. The method of claim 22, further comprising classifying each element as a constant image or as a dirty image, the act of classifying categorizing the element as a constant image if the timestamp of the element is an old timestamp and categorizing the element as a dirty image if the timestamp of the element is a new timestamp, wherein the act of rendering renders those elements that are classified as dirty.

25. The method of claim 24, wherein constructing a current scene graph for the current frame includes constructing a current scene graph from a number of subgraphs prior to the execution of the act of rendering, each subgraph being formed by a top node and multiple nodes under the top node, each node representing an element, and wherein classifying each element as a constant image or a dirty image includes classifying the multiple nodes in the same category as the top node of a subgraph without categorizing each node of the multiple nodes in the subgraph.

26. The method of claim 25, wherein each element is represented by a boundary box having coordinates, and further comprising consolidating a set of boundary boxes if the coordinates of each boundary box overlap with the coordinates of other boundary boxes in the set.

* * * * *

UNITED STATES PATENT AND TRADEMARK OFFICE
CERTIFICATE OF CORRECTION

PATENT NO.    : 6,487,565 B1                                          Page 1 of 1
DATED         : November 26, 2002
INVENTOR(S)   : G.D. Schechter et al.

It is certified that error appears in the above-identified patent and that said Letters Patent is hereby corrected as shown below:

Title page,
Item [57], ABSTRACT,
Lines 2-3, "times-
      tamps" should break as follows -- time-
      stamps --

Column 3,
Line 67, "mousebutton" should read -- mouse-button --

Column 7,
Lines 4, 10 and 18, "ConstImg" shoud read -- ConstImg --

Column 9,
Lines 17-18, "times-
      tamp;" should break as follows -- time-
      stamp; --

Column 10,
Lines 32-33, "times-
      tamp;" should break as follows -- time-
      stamp; --

Signed and Sealed this

Fifth Day of August, 2003

JAMES E. ROGAN
*Director of the United States Patent and Trademark Office*